(12) United States Patent
Hara et al.

(10) Patent No.: US 7,370,099 B2
(45) Date of Patent: May 6, 2008

(54) CLUSTER COMPUTING SYSTEM AND ITS FAILOVER METHOD

(75) Inventors: Norie Hara, Hiratsuka (JP); Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 10/652,161

(22) Filed: Aug. 28, 2003

(65) Prior Publication Data

US 2005/0005001 A1  Jan. 6, 2005

(30) Foreign Application Priority Data

Mar. 28, 2003 (JP) .............................. 2003-091265

(51) Int. Cl.
   *G06F 15/173* (2006.01)
(52) U.S. Cl. ...................................... 709/223
(58) Field of Classification Search ............... 709/223, 709/224
   See application file for complete search history.

(56) References Cited

U.S. PATENT DOCUMENTS

| | | | | |
|---|---|---|---|---|
| 5,751,789 A * | 5/1998 | Farris et al. | ............. | 379/32.04 |
| 6,088,659 A | 7/2000 | Kelley et al. | | |
| 6,144,999 A * | 11/2000 | Khalidi et al. | ............... | 709/219 |
| 6,163,855 A * | 12/2000 | Shrivastava et al. | ........... | 714/4 |
| 6,279,032 B1 * | 8/2001 | Short et al. | .................. | 709/209 |
| 6,317,844 B1 * | 11/2001 | Kleiman | ......................... | 714/6 |
| 6,385,643 B1 * | 5/2002 | Jacobs et al. | ................ | 709/203 |
| 6,754,785 B2 * | 6/2004 | Chow et al. | ................. | 711/147 |
| 6,859,834 B1 * | 2/2005 | Arora et al. | ................. | 709/227 |
| 6,952,737 B1 * | 10/2005 | Coates et al. | ................ | 709/229 |
| 2002/0069334 A1 | 6/2002 | Hsia et al. | | |
| 2002/0095489 A1 | 7/2002 | Yamagami | | |
| 2002/0103816 A1 | 8/2002 | Ganesh et al. | | |
| 2002/0133601 A1 * | 9/2002 | Kennamer et al. | .......... | 709/229 |
| 2002/0133746 A1 * | 9/2002 | Chen et al. | .................... | 714/13 |
| 2003/0005356 A1 | 1/2003 | Franckowiak et al. | | |
| 2003/0087629 A1 * | 5/2003 | Juitt et al. | ................... | 455/411 |

(Continued)

FOREIGN PATENT DOCUMENTS

EP   1076282   2/2001

(Continued)

OTHER PUBLICATIONS

S. Cardoso, Borland "Using JDataStoreTM 6 as a Mobile Database on Wireless Devices", JDataStore, White Paper, pp. 1-8.

(Continued)

*Primary Examiner*—Andrew Caldwell
*Assistant Examiner*—Bradford F. Fritz
(74) *Attorney, Agent, or Firm*—Mattingly, Stanger, Malur & Brundidge, P.C.

(57) ABSTRACT

A cluster computing system includes an active system and a standby system connected via wire networks. The active system and the standby system each has a wireless communications apparatus, such that when all of the wire networks connecting the active system with the standby system are disconnected, the wireless communications apparatus of the active system reports the standby system of the failure of the active system using its wireless communications capability with the wireless communications apparatus of the standby system. The report includes the verification ID of the active system, and the standby system begins operation upon receiving a packet containing the verification ID.

15 Claims, 15 Drawing Sheets

U.S. PATENT DOCUMENTS

2004/0148397 A1* 7/2004 Aronoff et al. ............. 709/227

FOREIGN PATENT DOCUMENTS

| | | |
|---|---|---|
| EP | 1076282 A2 | 2/2001 |
| JP | 08-272666 | 10/1996 |

OTHER PUBLICATIONS

BlackBerry Enterprise Server Software, Version 2.0, pp. 1-69.
S. Cardoso, Borland "Using JDataStoreTM 6 as a Mobile Database on Wireless Devices", JDataStore, White Paper, pp. 1-8, Aug. 2002.
BlackBerry Enterprise Server Software, Version 2.0, pp. 1-69, Apr. 4, 2000.

* cited by examiner

CLUSTER COMPUTING SYSTEM AND ITS FAILOVER METHOD

BACKGROUND OF THE INVENTION

1. Field of the Invention

The present invention relates to a cluster computing system and its failover method, where the cluster computing system is a duplex clustering system that has an active system and a standby system, and that can operate both systems without inconsistencies even in the event of a failure of networks that connect the sites of the two systems and recover from the failure.

2. Related Background Art

A cluster computing system is a system that operates a plurality of servers as one system in order to enhance the availability and reliability of the system. A function in which an alternate server takes over data and processing in the event of a failure in such a cluster computing system is called a "failover," which is an important technology in improving the reliability of the system.

Generally, a cluster computing system has one storage apparatus system shared by a plurality of host computers or a plurality of storage apparatuses each separately accessible by one of a plurality of host computers. In a configuration called a duplex system, one of a plurality of host computers operates as an active host computer and performs operation processing, such as data read/write to and from the storage apparatuses, while other host computers are in a standby state as standby host computers. The active host computer and the standby host computers monitor the status of each other, such that when a failure occurs on one of the host computers, the other host computer detects the failure and takes over the operation processing. A cluster computing system using a technology to perform private communications (heartbeat communications) by selectively using links between sites is disclosed as a cluster computing system described above.

The configuration and operations of a typical prior art cluster computing system are described below with reference to FIGS. 17-20.

FIG. 17 is the general system configuration of a cluster computing system in which a storage apparatus system is shared by host computers.

FIG. 18 is a diagram illustrating a situation in which a failure occurs in a host computer A in the system shown in FIG. 17.

FIG. 19 is the general system configuration of a cluster computing system in which a separate storage apparatus system is provided at each site.

FIG. 20 is a diagram illustrating a situation in which a failure occurs in a storage apparatus system A of a site A in the system shown in FIG. 19.

In a cluster computing system in which a storage apparatus system is shared by host computers, a host computer A10, which is an active host computer, and a host computer B11, which is a standby host computer, are connected to a storage apparatus system 50 by interface cables A40 and B41, respectively, to perform I/O requests.

The host computer A10 that performs operation processing and the host computer B11 that is in a standby state have heartbeat communications with each other via an IP network 30, which connects them, in order to monitor the status of each other.

A disk volume that is logical (hereinafter called a "logical disk volume") that the storage apparatus system 50 has is accessed by the host computer A10 under normal operating state.

If a failure occurs on the host computer A10 as shown in FIG. 18, the standby host computer B11 detects the failure through the IP network 30 and begins operations; the host computer B11 takes over the processing of the host computer A10 and accesses the storage apparatus system 50.

A cluster computing system having such a configuration can maintain operation processing even if a failure occurs on one of the host computers.

However, if a failure occurs on the storage apparatus system itself that stores the data necessary for operation processing, the operation processing cannot be continued in such a cluster computing system.

For this reason, a configuration shown in FIG. 19, in which an active host computer and a standby host computer have separate storage apparatuses, may be considered.

In a cluster computing system with the configuration shown in FIG. 19, a site A100, which is active, and a site B101, which is standby, have a storage apparatus system A51 and a storage apparatus system B52, respectively. Remote copying takes place at all times between the two storage apparatus systems A51 and B52. Remote copying is a technology in which a plurality of storage apparatus systems installed at physically remote locations copy data (dual writing) without the intervention of any host computers.

For performing remote copying, the storage apparatus systems are connected to each other by a dedicated line or a public telephone line (or a Fibre Channel (FC) network 90 in FIG. 19), such that a copy source logical disk volume of the storage apparatus system A51 of the active site A100 is copied to a copy destination logical disk volume of the storage apparatus system B52 of the standby site B101.

In this way, the storage apparatus system B52 operates as a backup system for the storage apparatus system A51, thereby maintaining the consistency of data.

When a failure occurs in the storage apparatus system A51 as shown in FIG. 20, the host computer A10 detects the failure and reports via an IP network 30, which connects the sites, to the host computer B11 that a failure has occurred in the storage apparatus system A51.

In the meantime, the storage apparatus system B52 of the site B101 also detects via the FC network 90 that a failure has occurred in the storage apparatus system A51, which is the remote copy source.

Upon receiving the report from the host computer A10 and checking the status of the storage apparatus system B52 via an interface cable B41, the host computer B11 recognizes that a failure has occurred in the storage apparatus system A51 of the site A100 and performs an operation to take over the operation processing.

When the storage apparatus system A51 of the site A100 recovers to a state where it can execute operation processing after the operation processing has been taken over by the site B101 from the site A100, the storage apparatus system B52, to which is connected the host computer B11 that took over the operation processing, is set as a remote copy source, while the recovered storage apparatus system A51 is reset as a remote copy destination; by performing remote copying in this manner, data can be recovered to the storage apparatus system A51 without suspending the operation of the entire system.

In the prior art configuration in which different sites have their own storage apparatus system as shown in FIG. 19, operation processing can be continued even when a failure occurs in the active storage apparatus system itself, unlike the system shown in FIG. 17 where a plurality of host computers shares a storage apparatus system.

In a cluster computing system, host computers must constantly monitor each other in order to be able to take over operation processing. In the system shown in FIG. 19, the heartbeat communications on the IP network that connects the host computers and the remote copying on the FC network that connects the storage apparatus systems are utilized to check the status of the counterpart sites and recognize any occurrence of failure. The system, however, may not recover smoothly from failures, depending on the mode of failure occurrence.

Referring to FIGS. 21 and 22, a description is made as to situations in which the system does not recover smoothly from failures, depending on the mode of failure occurrence.

FIG. 21 is a diagram illustrating a situation in which a failure occurs on the IP network 30 and the FC network 90 in the configuration shown in FIG. 19.

FIG. 22 is a diagram illustrating a situation in which a failure occurs at the site A in the configuration shown in FIG. 19.

One mode of failure occurrence is a situation in which, as shown in FIG. 21, both the IP network 30 that connects the host computer A10 of the site A100 with the host computer B11 of the site B101, and the FC network 90 that connects the storage apparatus system A51 of the site A100 with the storage apparatus system B52 of the site B101 become disconnected (hereinafter called a "total disconnection of networks between sites" or simply a "total inter-site network disconnection state").

In such a situation, since there is no means of communication between the sites, the sites cannot monitor the status of each other.

Another mode of failure occurrence is a situation in which, as shown in FIG. 22, both the host computer A10 and the storage apparatus system A51 of the site A100 fail simultaneously, for example, which causes the entire system within the site A100 to fail (hereinafter called a "site failure").

From the perspective of the host computer B11 of the site B101, since it cannot obtain information from the site A100 in either situation, the host computer B11 cannot determine whether the problem is a total disconnection of networks between sites shown in FIG. 21 or a site failure shown in FIG. 22.

Generally in conventional cluster computing systems, when a total disconnection of networks between sites occurs and the sites become incapable of monitoring each other, the site that did not fail cannot obtain information about the counterpart site at all; this situation leaves the following three options available based on logic:

(1) a state in which operation processing is executed at both sites regardless of the status of counterpart sites (i.e., a split brain state);

(2) a state in which operation processing is halted at both sites regardless of the status of counterpart sites; and (3) a state in which operation processing is continued only at the site that had been executing operation processing until then.

For example, when the (1) split brain state results from a total disconnection of networks between sites shown in FIG. 21, the host computers at both sites update data in the logical disk volumes in their respective storage apparatus systems, which causes data in the remote copy source and data in the remote copy destination to be inconsistent.

In reality, if in the total disconnection of networks between sites in FIG. 21 the host computer A10 of the site A100 determines that a site failure has occurred at the site B101 and continues to operate, while the host computer B11 of the site B101 also determines that a site failure has occurred at the site A100, the (1) split brain state results.

Consequently, although the site B101 must remain in a standby state while the site A100 remains active in the total disconnection of networks between sites in FIG. 21, the site B101 cannot control logically since it cannot differentiate the total disconnection of networks between sites from the site failure in FIG. 22. In the situation in FIG. 22, unless the site B101 begins operation upon confirming a failure, it would result in (2) state.

Consequently, the prior art in general entails the problem of not being able to ensure the reliability of the system as a whole unless the standby site B101 can differentiate the total disconnection of networks between sites from the site failure.

Also, when the cluster computing system is provided with a plurality of routes or links to be selected between sites, such a cluster computing system may be more sound and more reliable than ordinary cluster computing systems without such selectable links. However, even such a system cannot cope with hazards such as large-scale fire of a site itself or of a communication route between sites when the communication condition is extremely poor.

SUMMARY OF THE INVENTION

The present invention has been conceived to solve the above problem, and relates to a cluster computing system that has an active system and a standby system, and that can operate both systems without inconsistencies even in the event of a failure of networks that connect the sites of the two systems, regardless of the mode of failure, and recover from the failure.

The above problem occurs due to the fact that checking the status of counterpart sites in a cluster computing system having a plurality of sites relies on a network between host computers or on a network between storage apparatus systems. When such network communications are interrupted, the sites are incapable of checking the status of each other.

Networks between sites, such as IP networks and FC networks, for monitoring the status of counterpart sites are wire cables. However, when using wire cables, the possibility of all cables becoming simultaneously disconnected (a total disconnection of networks between sites) as a result of an earthquake or cable fire cannot be denied. A disconnection of wire cables can significantly undermine the effectiveness of disaster recovery, which is a feature of cluster computing systems.

In accordance with an embodiment of the present invention, failure reports to counterpart sites take place using wireless communications apparatuses in order to eliminate the shortcoming entailed in using another wire cable as a means to monitor status.

According to this configuration, a cluster computing system according to the present embodiment may operate in a similar manner as a conventional cluster computing system would in the absence of failure, while enhancing the reliability of the system by ensuring a communication means between counterpart sites through wireless communications even in situations where an ordinary cluster computing system would not be able to maintain appropriate operation, such as when a wire cable as a means of monitoring status is disconnected.

In other words, in accordance with the embodiment of the present invention, by using an infrastructure (e.g., satellite communications, wireless LAN) different from wire cables, which entail a high possibility of disconnection, failure reports using wireless communications apparatuses, which have minimal possibility of simultaneous failure with wire cables, are provided as an alternative to information exchange between sites using wire cables. As a result, a system in which failure reports can be sent to a counterpart site even after a total disconnection of networks between sites occurs can be realized. Consequently, in any of the three logics indicated earlier, appropriate operation (i.e., taking over operation processing when a failure occurs) in a cluster computing system can be realized.

However, wireless communications entail problems in terms of unstable communications, such as electromagnetic interference and operational errors. For this reason, instead of permanent connections to constantly monitor the status of counterpart sites as in status monitoring in conventional cluster computing systems, the connection of the wireless communications used in the present embodiment may be limited to situations only when operation processing is to be taken over after a total disconnection of networks between sites occurs, thereby minimizing problems entailed in wireless communications.

Due to the fact that failure reports by wireless communications apparatuses used in a system in accordance with the embodiment of the present invention do not entail exchange of complicated data or permanent connections as in status monitoring in conventional networks between sites, and are instead limited to reporting an occurrence of failure when a failure occurs, a measure to monitor status according to the present embodiment has a configuration different from conventional configurations.

Other objects, features and advantages of the invention will become apparent from the following detailed description taken in conjunction with the accompanying drawings.

DESCRIPTION OF PREFERRED EMBODIMENTS

First Embodiment

Preferred embodiments of the present invention are described below with reference to the accompanying drawings.

First, a cluster computing system in accordance with a first embodiment of the present invention is described with reference to FIGS. 1 through 15.

(I) The System Configuration of Cluster Computing System:

First, referring to FIGS. 1-4, a system configuration of the cluster computing system according to the first embodiment of the present invention is described.

Figure 1:
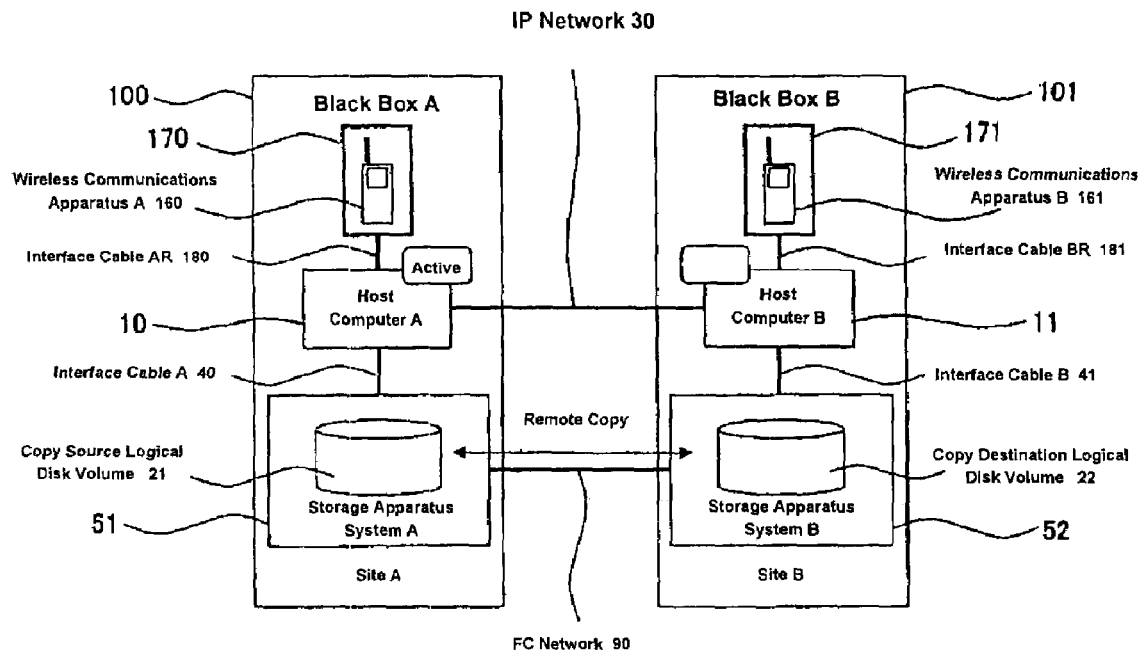
FIG. 1 shows a diagram of a system configuration of a cluster computing system in accordance with a first embodiment of the present invention.

FIG. 1 is a diagram of the system configuration of a cluster computing system according to the first embodiment of the present invention.

Figure 2:
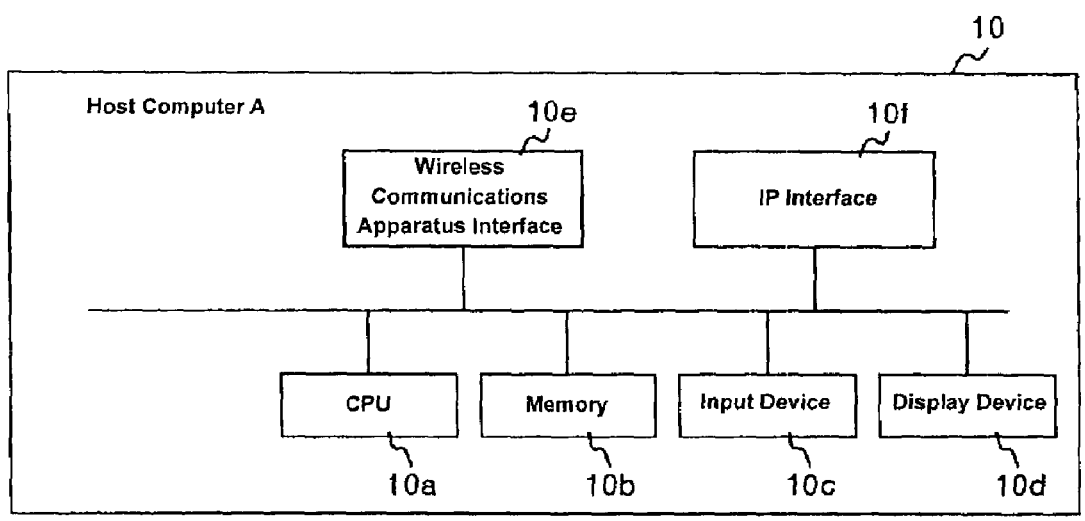
FIG. 2 shows a diagram of the internal configuration of a host computer A.

FIG. 2 is a diagram of the internal configuration of a host computer A.

Figure 3:
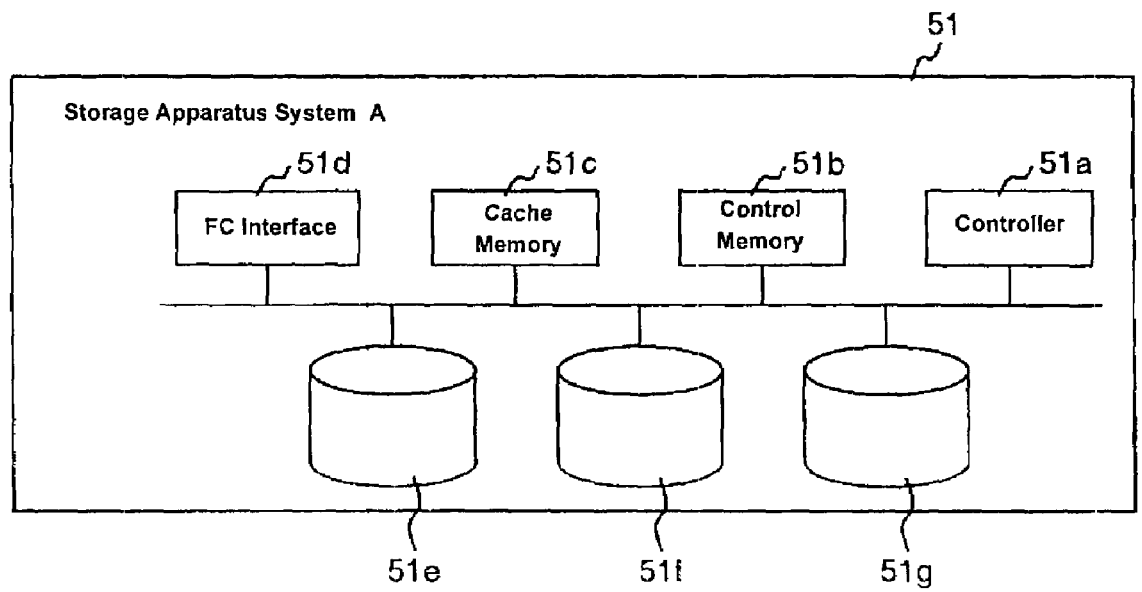
FIG. 3 shows a diagram of the internal configuration of a storage apparatus system A.

FIG. 3 is a diagram of the internal configuration of a storage apparatus system A.

Figure 4:
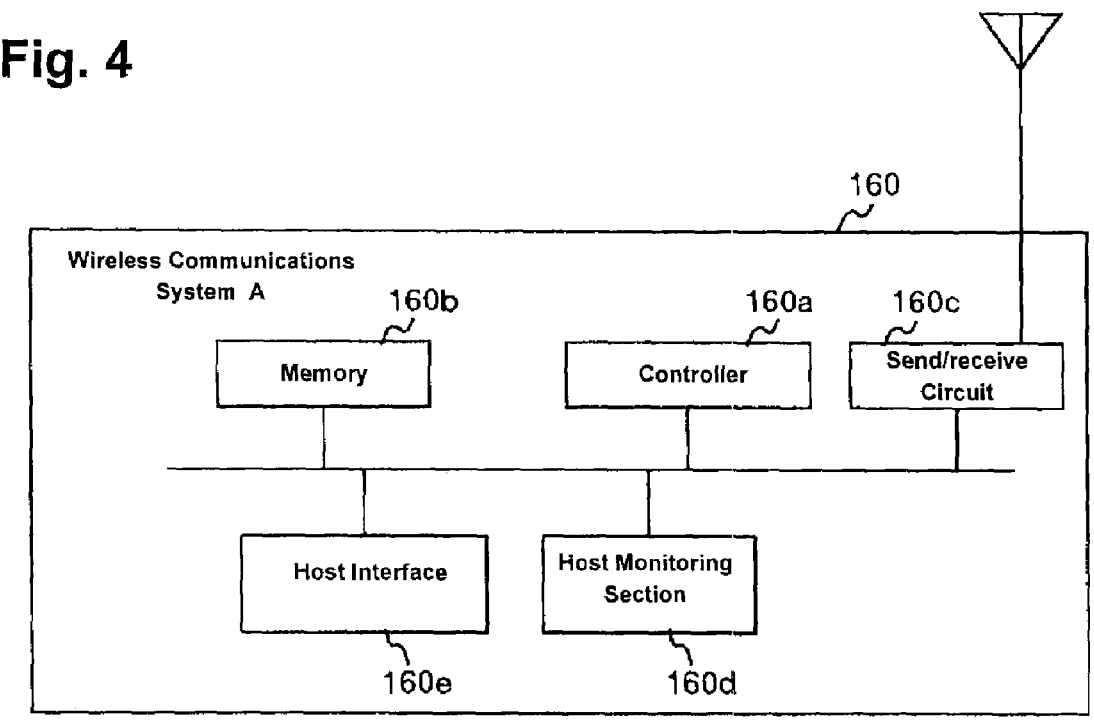
FIG. 4 shows a diagram of the internal configuration of a wireless communications apparatus A.

FIG. 4 is a diagram of the internal configuration of a wireless communications apparatus A.

The cluster computing system in accordance with the first embodiment of the present invention includes a site A100, which is an active system, and a site B101, which is a standby system, as shown in FIG. 1.

In a configuration similar to the prior art, a host computer A10, which is an active host computer, and a host computer B11, which is a standby host computer, are connected to storage apparatus systems 51 and 52, respectively, by interface cables A40 and B41, respectively, to perform I/O requests.

Also, the host computer A10 that performs operation processing and the host computer B11 that is in a standby state have, via an IP network 30 that connects them, heartbeat communication in order to monitor the status of each other.

Furthermore, the cluster computer system in accordance with the present embodiment is provided with a remote copy function, such that a copy source logical disk volume 21 of the storage apparatus system A51 of the active site A100 is copied to a copy destination logical disk volume 22 of the storage apparatus system B52 of the standby site B101 through an inter-storage network such as an FC network 90.

The host computer A10 of the site A100 as the host computer of the active system executes operation processing such as read/write to and from the storage apparatus system A51 connected to the host computer A10 by the interface cable A40. In the meantime, the host computer B11 of the site B101 is in a standby state as the standby host computer.

A wireless communications apparatus A160 is further connected to the host computer A10 of the site A100 via an interface cable AR180, while a wireless communications apparatus B161 is connected to the host computer B11 of the site B101 via an interface cable BR181.

The wireless communications apparatuses A160 and B161 are housed in disaster-resistant containers, which are similar to black boxes that house airplane voice recorders, in order to prevent any failure from affecting the wireless communications apparatuses A160 and B161 even in the event of a site failure caused by an earthquake, fire or terrorism, for example, such that a report of site status can be made to the counterpart site even after a site failure occurs.

The wireless communications apparatus A160 of the site A100 has a function, based on an instruction from the host computer A10 or on a self-judgment that the host computer A10 has failed, to call the wireless communications apparatus B161 of the site B101 and to report to the host computer A10 whether such a call has succeeded. The wireless communications apparatus A160 also monitors the status of the host computer A10 via the interface cable AR180. As a result, even if a site failure occurs at the site A100, the wireless communications apparatus A160 can detect the failure via the interface cable AR180 and can call the wireless communications apparatus B161 for the site B101 to take over the operation processing the site A100 had been performing until then. On the other hand, the wireless communications apparatus B161 of the site B101 has functions to receive calls from the wireless communications apparatus A160 of the site A100 and to report to the host computer B11 whether such a call has been received; and like the wireless communications apparatus A160, the wireless communications apparatus B161 also monitors the status of the host computer B11 via the interface cable BR181.

In this way, the wireless communications apparatuses A160 and B161 according to the present invention have particular programs to perform various functions, such as, for example, a function to begin a call based on an instruction from a host computer, a function to monitor the status of the host computer and to spontaneously begin a call based on the status, and a function to report the result of the call to the host computer, and are apparatuses that perform unique operations according to the present invention.

The wireless communications route may be satellite communications or wireless LAN functions. Furthermore, public communications network used in communication routes for mobile telephones may also be used.

As shown in FIG. 2, the host computer A10 includes a CPU 10a, a memory 10b, an input device 10c, a display device 10d, a wireless communications apparatus interface 10e, and an IP interface 10f.

The wireless communications apparatus interface 10e is an interface for communicating with the wireless communications apparatus A160, while the IP interface 10f is an interface for communicating with the other site. These may be the same communications interface.

As shown in FIG. 3, the storage apparatus system A51 comprises a controller 51a, a control memory 51b, a cache memory 51c, an FC interface 51d, and a plurality of disk apparatuses 51e, 51f, 51g, etc.

The controller 51a has a function to control various parts of the storage apparatus system A51. The cache memory 51c is a memory for caching data in order to make access to the disk apparatuses 51e, etc. at higher speeds, and the control memory 51b is a memory for caching control data used by the controller 51a. The FC interface 51d connects the storage apparatus system A51 to the other storage apparatus system B52 using a Fibre Channel.

As shown in FIG. 4, the wireless communications apparatus A160 includes a controller 160a, a memory 160b, a send/receive circuit 160c, a host monitoring section 1 60d, and a host interface 160e.

The controller 160a has the internal control of the wireless communications apparatus A160; the controller 160a receives commands sent from the host computer A10 via the host interface 160e and reports from the host monitoring section 160d, interprets them, and issues commands to the outside.

The host monitoring section 160d monitors the host computer A10 via the host interface 160e and reports the results to the controller 160a.

The send/receive circuit 160c performs baseband processing, carrier processing and high frequency processing, which are processing performed by ordinary wireless communications apparatuses, in order to send commands and data from the controller 160a to the outside and to receive commands and data from the outside and convey them to the controller 160a.

(II) Operation of Cluster Computing System at the Time of Failure:

The following is a description, using FIGS. 5-13, of the operation of the cluster computing system according to the present embodiment when a failure occurs.

(II-1) Summary of Failure Modes and Operations:

First, referring to FIGS. 5-8, failure modes and operations of the cluster computing system according to the present embodiment are described.

Figure 5:
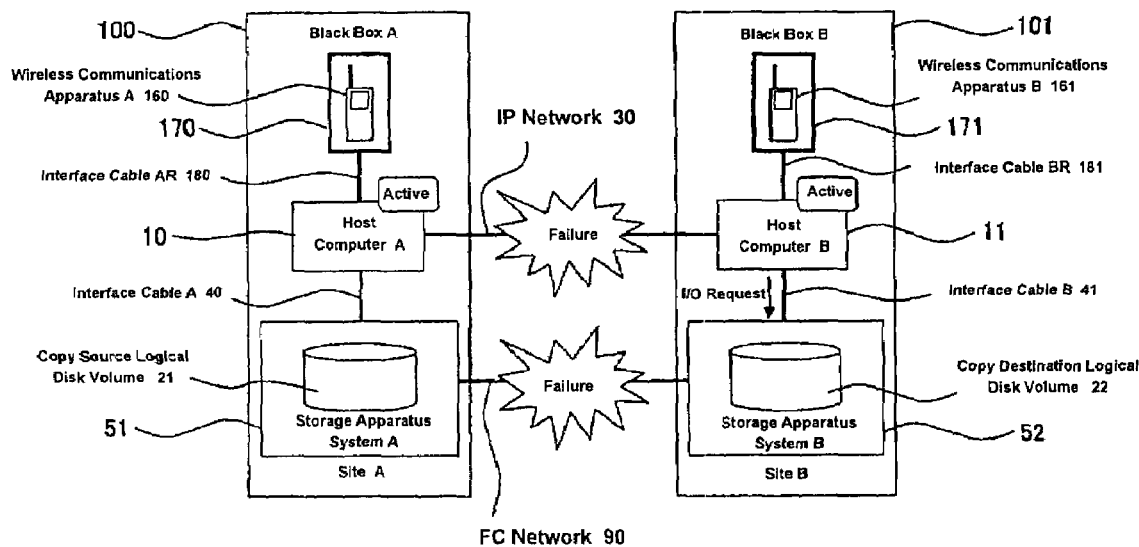
FIG. 5 shows a diagram illustrating a situation in which a total disconnection of networks between sites occurs in the cluster computing system according to the present invention.

FIG. 5 is a diagram illustrating a situation in which a total disconnection of networks between sites occurs in the cluster computing system according to the present invention.

Figure 6:
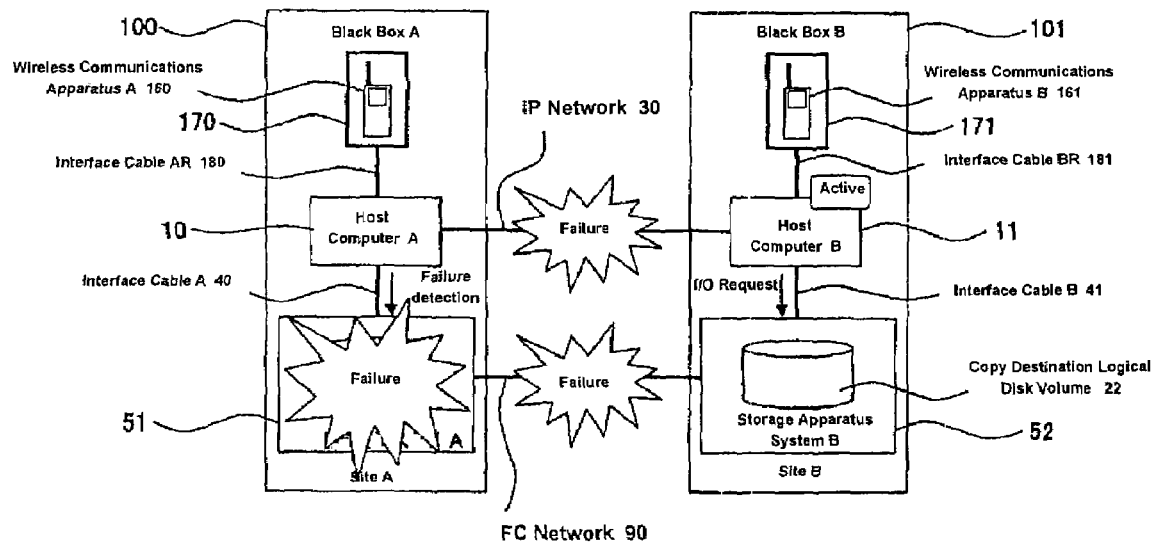
FIG. 6 shows a diagram illustrating a situation in which a total disconnection of networks between sites and a storage apparatus system failure occur simultaneously in the cluster computing system according to the present invention.

FIG. 6 is a diagram illustrating a situation in which a total disconnection of networks between sites and a storage apparatus system failure occur simultaneously in the cluster computing system according to the present invention.

Figure 7:
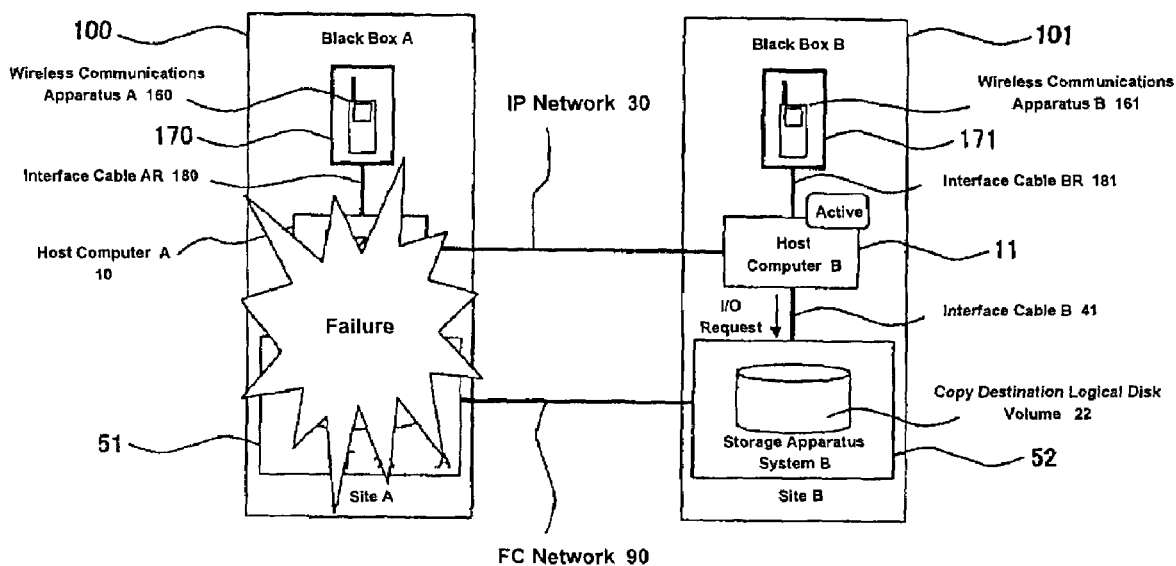
FIG. 7 shows a diagram illustrating a situation in which a site failure occurs in the cluster computing system according to the present invention.

FIG. 7 is a diagram illustrating a situation in which a site failure occurs in the cluster computing system according to the present invention.

Figure 8:
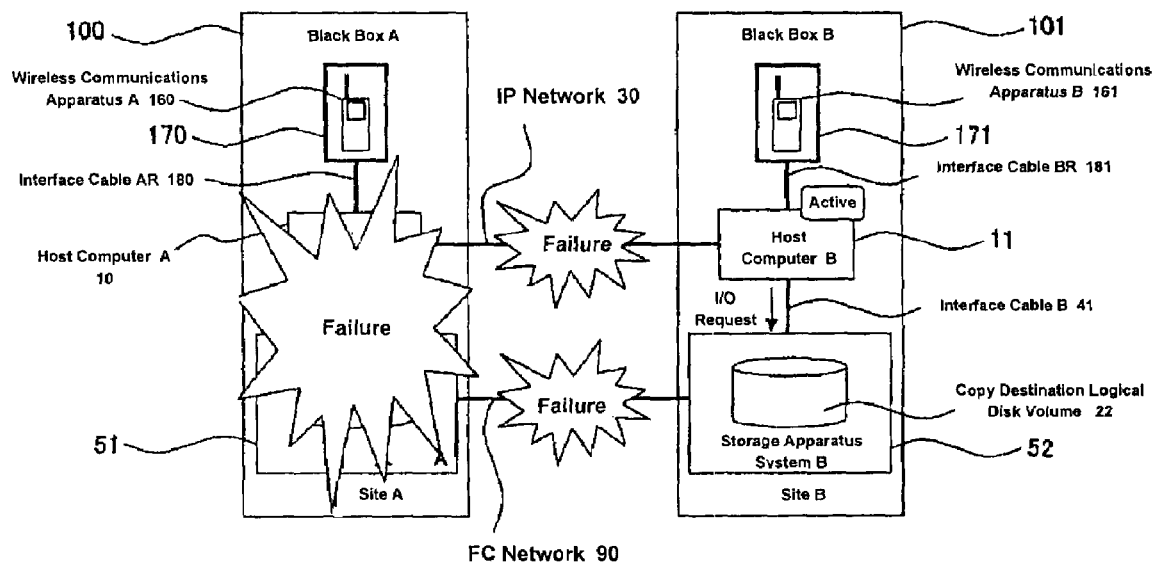
FIG. 8 shows a diagram illustrating a situation in which a total disconnection of networks between sites and a site failure occur simultaneously in the cluster computing system according to the present invention.

FIG. 8 is a diagram illustrating a situation in which a total disconnection of networks between sites and a site failure occur simultaneously in the cluster computing system according to the present invention.

A total disconnection of networks between sites is a situation indicated in FIG. 5, as described above, when both the IP network 30, which connects the host computer A10 of the site A100 with the host computer B11 of the site B101, and the FC network 90, which connects the storage apparatus system A51 of the site A100 with the storage apparatus system B52 of the site B101, are both disconnected.

In such a case, the active system continues operation while the standby system continues to stand by, according to the cluster computing system of the present invention.

When a storage apparatus system failure occurs in a state of total disconnection of networks between sites, as shown in FIG. 6, the site A100 communicates via the wireless communications apparatus A160 with the site B101, and the standby system begins operation for the first time.

A site failure is a situation in which the entire system of the site A100 fails as shown in FIG. 7, due to, for example, the host computer A10 and the storage apparatus system A51 of the site A100 failing simultaneously.

In this case, the site A100 communicates via the wireless communications apparatus A160 with the site B101 and the standby system begins operation.

FIG. 8 indicates a situation in which a total disconnection of networks between sites and a site failure occur simultaneously.

As in the situation shown in FIG. 7, the site A100 communicates via the wireless communications apparatus A160 with the site B101 and the standby system begins operation in this situation as well.

In the situations shown in FIGS. 7 and 8, the wireless communications apparatus A160 of the site A100 detects a site failure and communicates this to the wireless communications apparatus B161 of the site B101, and the standby system begins operation.

The operation of the site B101 is the same in both situations illustrated in FIGS. 7 and 8; since information cannot be obtained from the site A100, the wireless communications apparatus B161 waits for a call from the wireless communications apparatus A160. When a failure occurs at the site A100, the wireless communications apparatus B161 receives a failure report and issues to the host computer B11 a command to begin operations, and operation begins in the site B101.

(II-2) Main Operation of Host Computer A10 of Site A100:

The main operation of the host computer A10 of the site A100 is described below with reference to FIG. 9.

Figure 9:
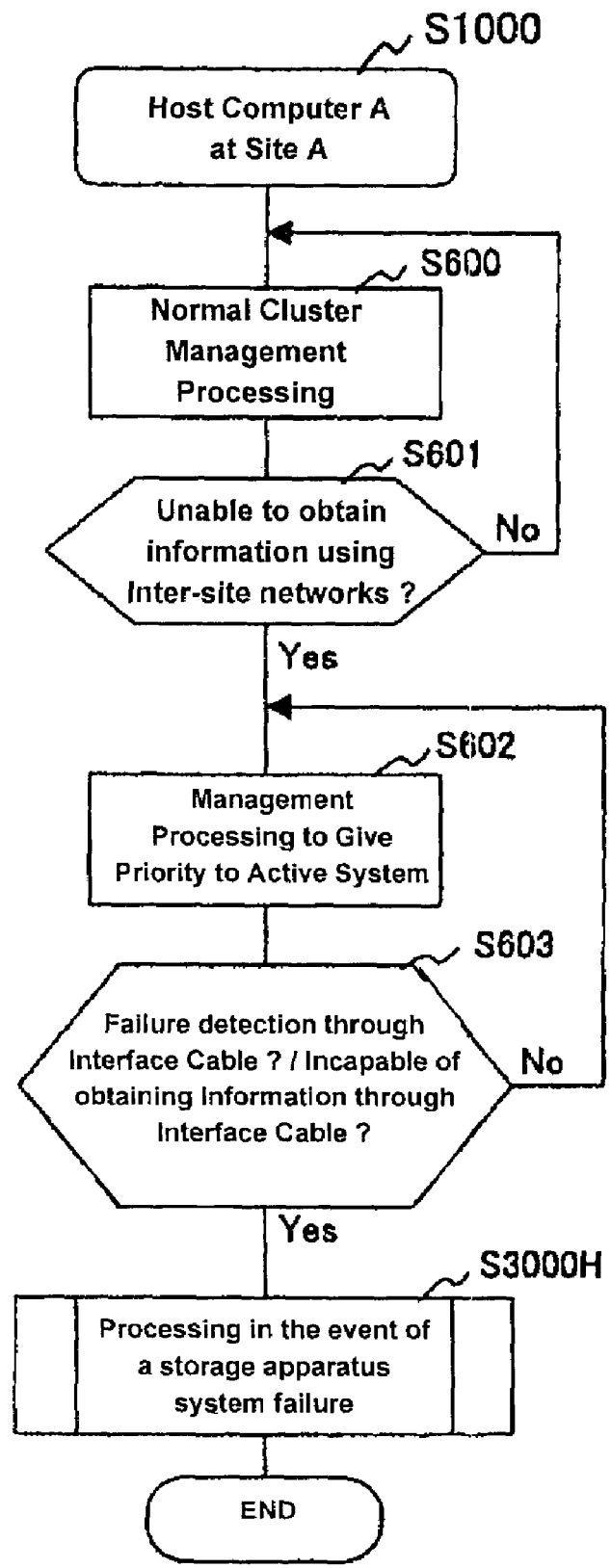
FIG. 9 shows a flowchart illustrating the main operation of the host computer A of a site A.

FIG. 9 is a flowchart illustrating the main operation of the host computer A10 of the site A100.

The host computer A10 of the site A100 performs operation processing as the host computer of the active system and uses networks between the sites, e.g., the IP network 30 and the FC network 90, to monitor the status of the site B101.

If in this state a failure that makes the operation processing impossible to be continued by the host computer A10 of the site A100 occurs in the system within the site A100, information to this effect is communicated via the networks between the sites and the operation processing is taken over by the host computer B11 of the site B101.

This series of operations is performed in conventional cluster computing systems and is called a "normal cluster management processing" (S600) in this embodiment.

When a total disconnection of networks between sites occurs during the normal cluster management processing and the host computer A10 becomes unable to obtain information about the site B101 using the networks between the sites (i.e., inter-site networks) (S601: Yes), the host computer A10 of the site A100 that had been performing operation processing until then shifts to a processing to continue to perform operation processing (hereinafter called a "management processing to give priority to active system," S602).

In conventional cluster computing systems, when a total disconnection of networks between sites occurs, host computers at both sites determine that a site failure has occurred at the counterpart site and either the site that had been performing operation processing until then would halt the operation processing (in which case, the operation processing would be halted at both sites) or the site that had been in a standby state until then would take over the operation processing (in which case, a split brain state would result); however, according to the cluster computing system of the present invention, even if a total disconnection of networks between sites occurs, the active system continues to execute the operations it had been executing until then. In the meantime, the site that had been in a standby state maintains its standby state.

Due to the fact that information can be communicated via wireless communications even if a total disconnection of networks between sites occurs, the "management processing to give priority to active system" takes place based on the concept that the active system should continue to perform processing while the standby system should begin operation processing only if and when it is instructed to do so by the active system.

If the host computer A10 detects through the interface cable A40 that a failure has occurred in the storage apparatus system A51 during the "management processing to give priority to active system" (S603: Yes), or if it cannot obtain information from the storage apparatus system A51 due to a failure of the interface cable A40 itself, the host computer A10 shifts to a "processing in the event of a storage apparatus system failure" (S3000H) since the host computer A10 can no longer continue the operation processing it had been performing until then.

(II-3) Main Operation of Wireless Communications Apparatus A160 of Site A100:

The main operation of the wireless communications apparatus A160 of the site A100 is described below with reference to FIG. 10.

Figure 10:
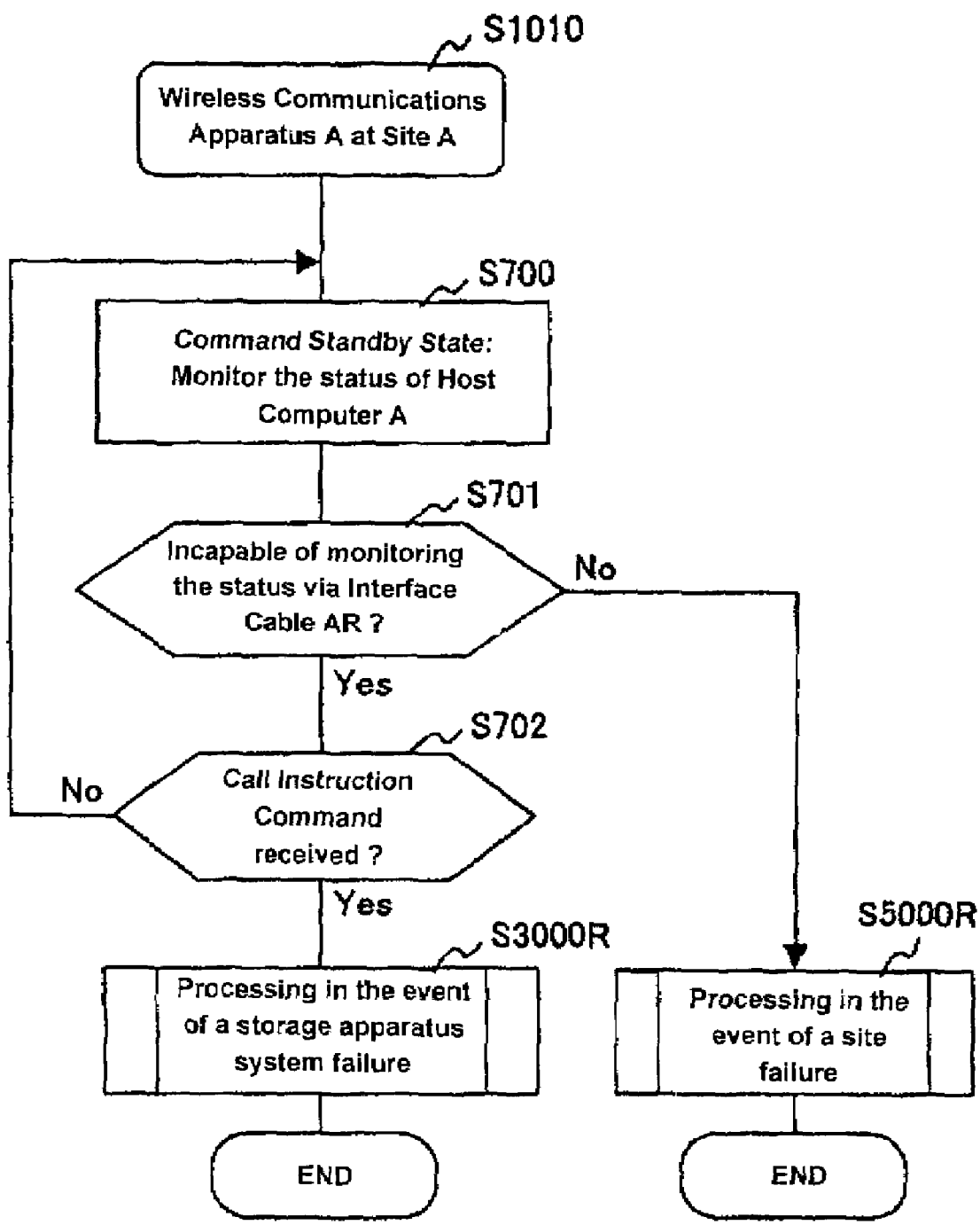
FIG. 10 shows a flowchart illustrating the main operation of the wireless communications apparatus A160 of the site A.

FIG. 10 is a flowchart illustrating the main operation of the wireless communications apparatus A160 of the site A100.

As described above with reference to FIG. 1, the wireless communications apparatus A160 of the site A100 is connected to the host computer A10 via the interface cable AR180.

The wireless communications apparatus A160 is normally in a standby state for a command (hereinafter called a "command standby state") (S700). At the same time, the wireless communications apparatus A160 monitors the status of the host computer A10 via the interface cable AR180 and constantly monitors information about the host computer A10 obtained through the interface cable AR180.

When the wireless communications apparatus A160 receives a call instruction command, described later, via the interface cable AR180 from the host computer A10 of the site A100 during the command standby state (S702: Yes), the wireless communications apparatus A160 shifts to a "processing in the event of a storage apparatus system failure" (S3000R).

On the other hand, if the wireless communications apparatus A160 cannot obtain information about the host computer A10 via the interface cable AR180 due to a site failure of the site A100 during the command standby state (S701: No), the wireless communications apparatus A160 shifts to a "processing in the event of a site failure" (S5000R).

Figure 11:
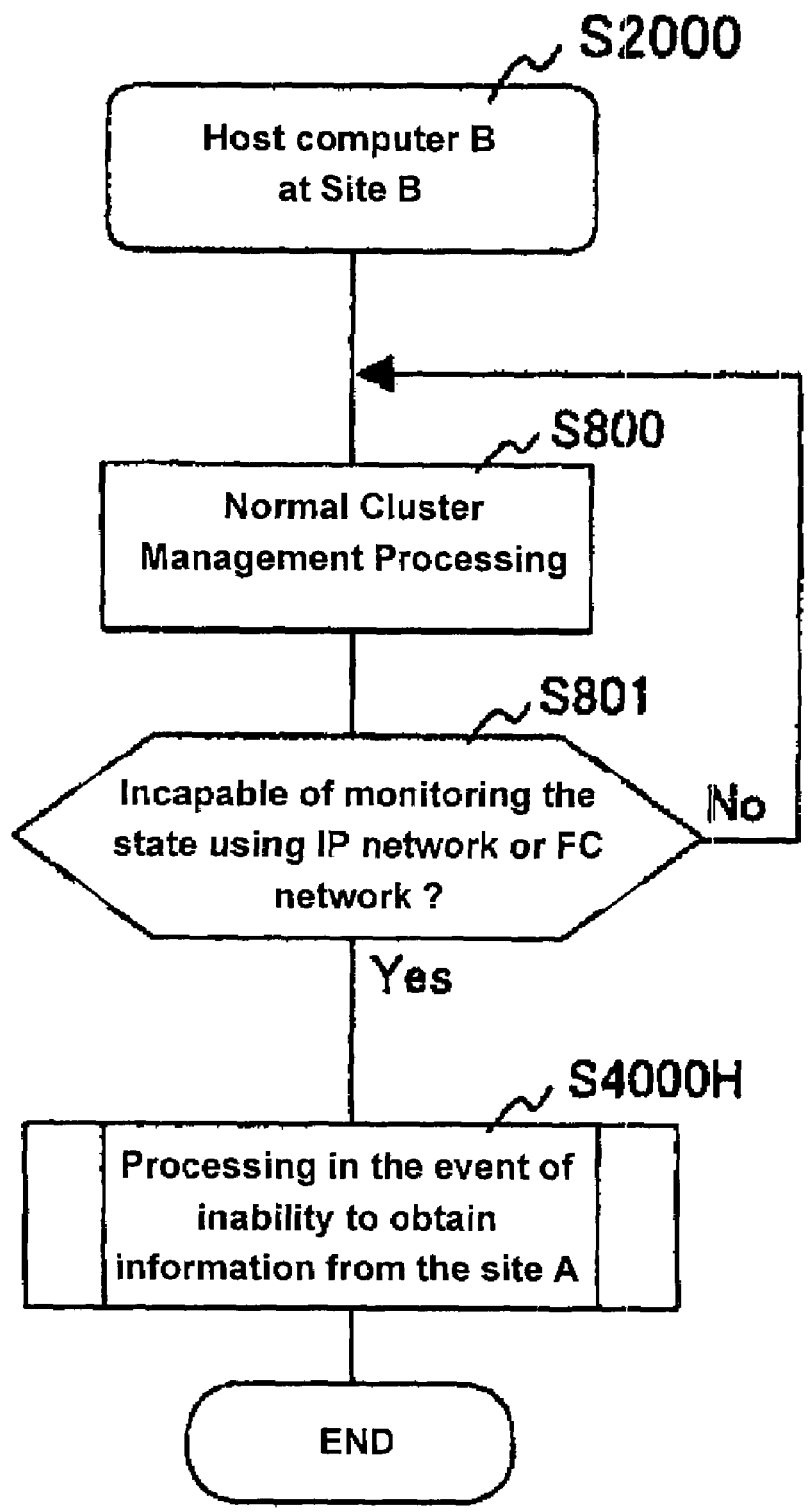
FIG. 11 shows a flowchart illustrating the main operation of a host computer B of a site B.

(II-4) Main Operation of Host Computer B11 of Site B101:

The main operation of the host computer B11 of the site B101 is described blow with reference to FIG. 11.

FIG. 11 is a flowchart illustrating the main operation of the host computer B11 of the site B101.

As described earlier, the host computer B11 of the site B101 is in a standby state as the host computer of the standby system and uses networks between the sites, e.g., the IP network 30 and the FC network 90, to monitor the status of the site A100.

If in this state a failure that makes the operation processing impossible to be continued at the site A100 occurs in the system within the site A100, the host computer B11 of the site B101 takes over the operation processing of the site A100. In other words, a management processing (the normal cluster management processing) that is similar to that of a conventional cluster computing system takes place (S800).

If it becomes impossible for the host computer B11 to monitor the status of the site A100 using the IP network 30 and/or the FC network 90 due to a total disconnection of networks between sites or a site failure of the site A100 during the normal cluster management processing (S801: Yes), the host computer B11 shifts to a "processing in the event of inability to obtain information from the site A100" (S4000H).

(II-5) Main Operation of Wireless Communications Apparatus B161 of Site B101:

The main operation of the wireless communications apparatus B161 of the site 101 is described below with reference to FIG. 12.

Figure 12:
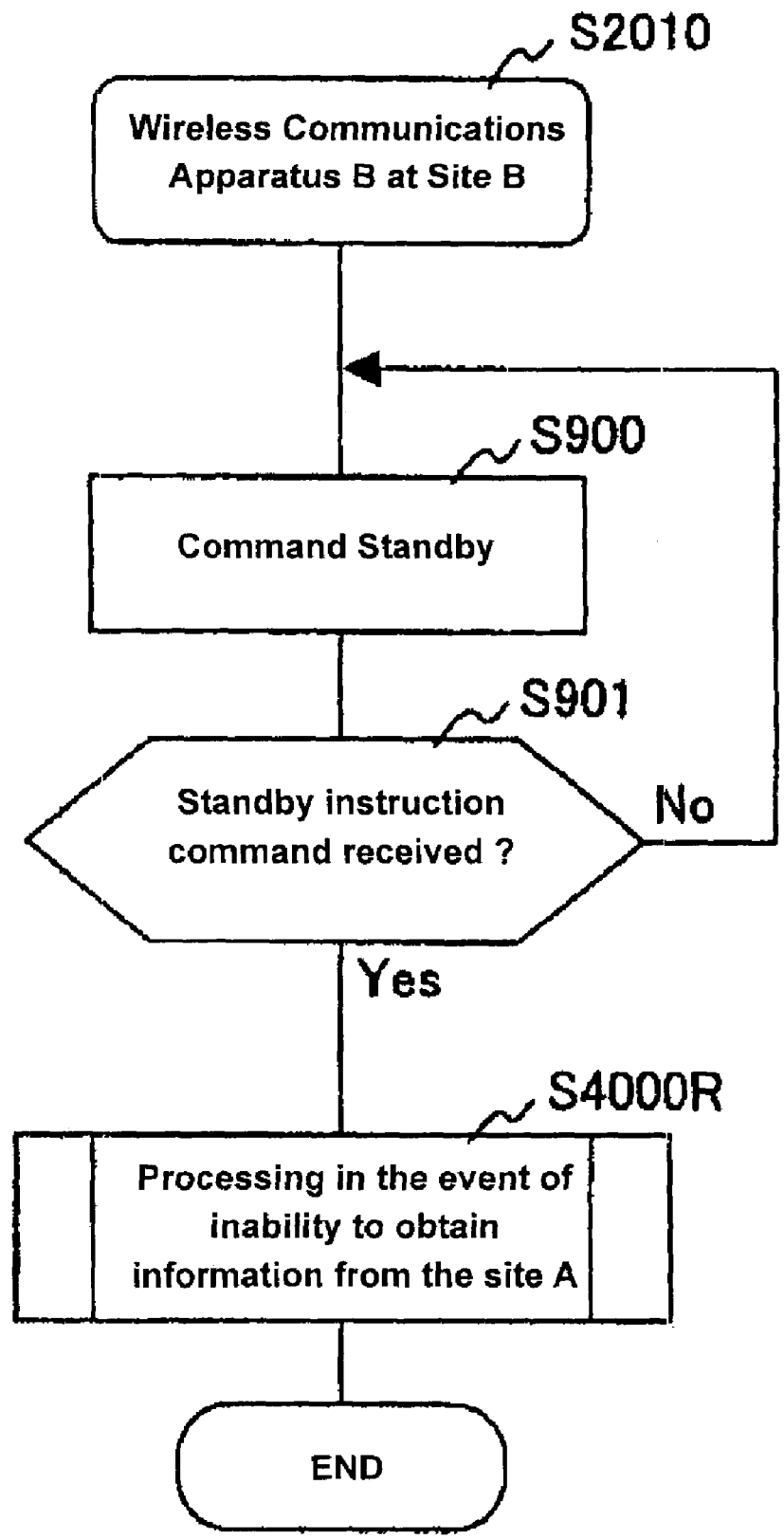
FIG. 12 shows a flowchart illustrating the main operation of a wireless communications apparatus B of the site B.

FIG. 12 is a flowchart illustrating the main operation of the wireless communications apparatus B161 of the site B101.

The wireless communications apparatus B161 of the site B101 is normally in the command standby state (S900).

If the wireless communications apparatus B161 receives a standby instruction command from the host computer B11 during the command standby state (S901: Yes), the wireless communications apparatus B161 shifts to a "processing in the event of inability to obtain information from the site A100" (S4000R).

(II-6) Operation of Processing in Event of Storage Apparatus System Failure of Site A100:

The operation of the "processing in the event of a storage apparatus system failure of the site A100" is described below with reference to FIG. 13.

Figure 13:
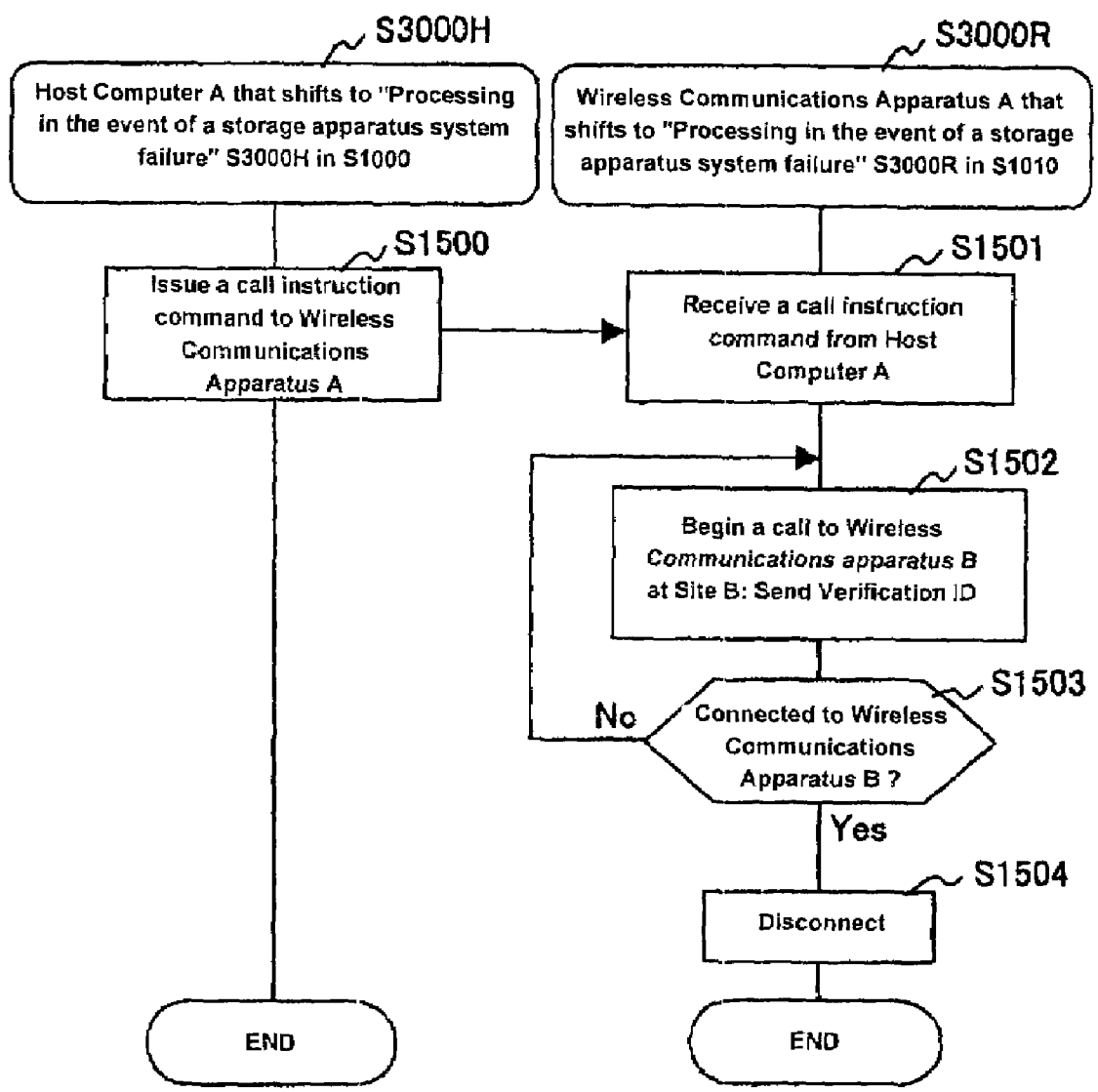
FIG. 13 shows a flowchart indicating side-by-side the operations of the host computer A and the wireless communications apparatus A for a "processing in the event of a storage apparatus system failure of the site A."

FIG. 13 is a flowchart indicating side-by-side the operations of the host computer A10 and the wireless communications apparatus A160 for the "processing in the event of a storage apparatus system failure of the site A."

Let us assume that a failure occurs in the storage apparatus system A51 of the site A100 after a total disconnection of networks between sites has occurred, as shown in FIG. 6.

The operation of the host computer A10 takes place when the host computer A10 in S1000 shifts to the flow for a "processing in the event of a storage apparatus system failure" (S3000H).

The host computer A10 of the site A100 issues the call instruction command to the wireless communications apparatus 160 via the interface cable AR180. The call instruction command is a command to instruct a call to the wireless communications apparatus B161.

Upon receiving the call instruction command (S701, S1501), the wireless communications apparatus A160 begins a call to the wireless communications apparatus B161 of the site B101 and sends a packet containing its own verification ID to identify itself (S1502).

The wireless communications apparatus A160 repeats the call to the wireless communications apparatus B161 until it connects with the wireless communications apparatus B161 (S1503: No); if the call connects with the wireless communications apparatus B161 even once (S1503: Yes), the call is immediately disconnected (S1504).

When the call from the wireless communications apparatus A160 to the wireless communications apparatus B161 succeeds, it signifies that a request to take over operation processing has been communicated.

As described later, since the site B101 begins operation processing if a call from the wireless communications apparatus A160 connects with the wireless communications apparatus B161 even once and it receives the verification ID of the wireless communications apparatus A160, the site A100 can terminate the "processing in the event of a storage apparatus system failure" at this point.

(II-7) Operation in Site B101 for Processing in the Event of Inability to Obtain Information from Site A100:

The operation in the site B100 for the "processing in the event of inability to obtain information from the site A100" is described below with reference to FIG. 14.

Figure 14:
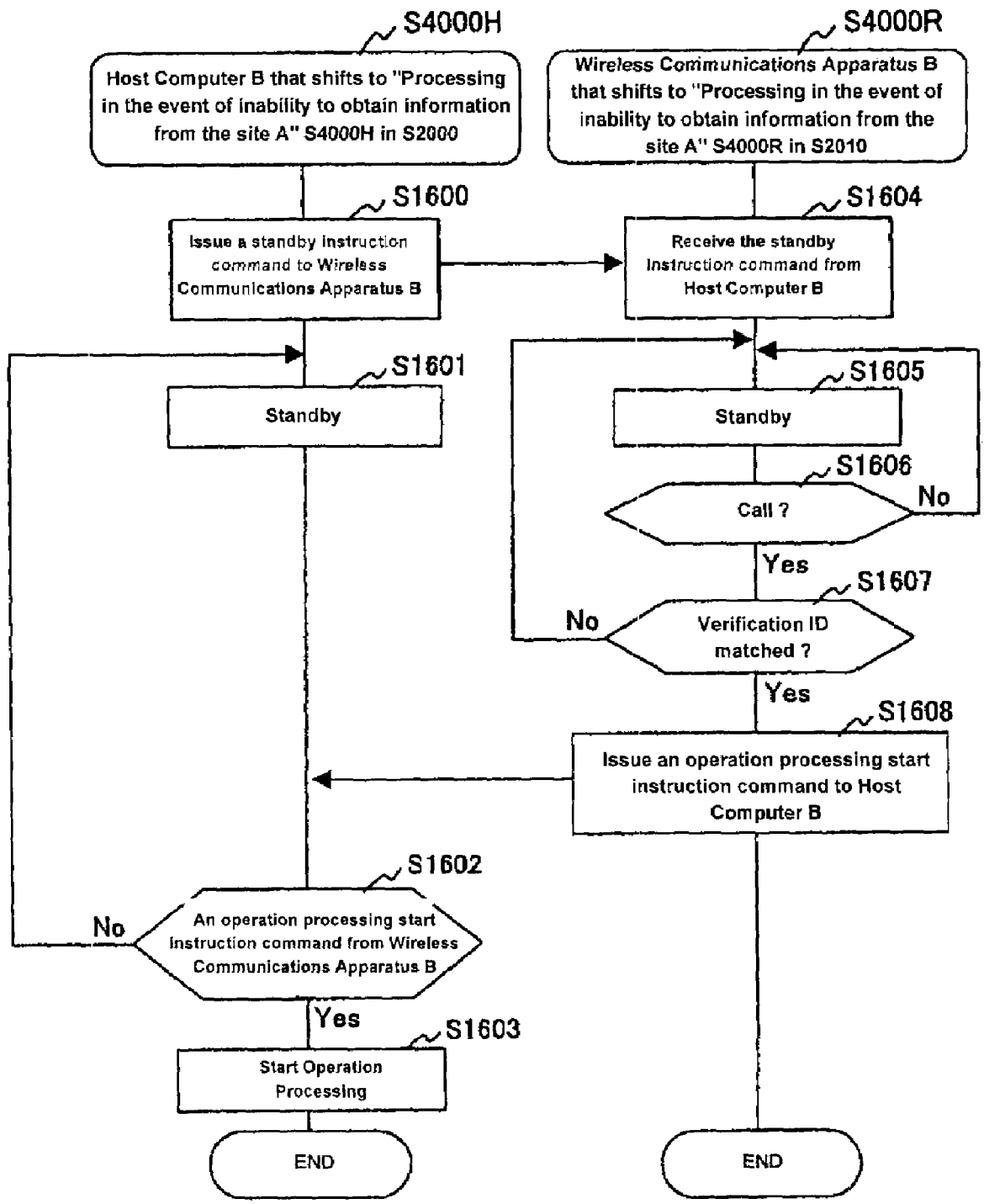
FIG. 14 shows a flowchart indicating side-by-side the operations of the host computer B and the wireless communications apparatus B in the site B for the "processing in the event of inability to obtain information from the site A."

FIG. 14 is a flowchart indicating side-by-side the operations of the host computer B11 and the wireless communications apparatus B161 in the site B101 for the "processing in the event of inability to obtain information from the site A100."

The failure mode can be a total disconnection of networks between sites as shown in FIG. 5, a site failure as shown in FIG. 7, or both as shown in FIG. 8.

The operation of the host computer B11 is the operation that takes place when the host computer B11 in S2000 shifts to the "processing in the event of inability to obtain information from the site A" (S4000H).

The host computer B11 of the site B101 issues a standby instruction command to the wireless communications apparatus B161 (S1600). The standby instruction command is a command for the wireless communications apparatus B161 to stand by for a call from the wireless communications apparatus A160.

When the wireless communications apparatus B161 receives the standby instruction command from the host computer B11 via the interface cable BR181 (S901, S1604), the wireless communications apparatus B161 goes into a standby state to wait for a call from the wireless communications apparatus A160 (S1605). The standby state is the only state in which the wireless communications apparatus B161 accepts calls from outside; if a call were to be made from the outside in states other than the standby state, the wireless communications apparatus B161 would ignore the call and maintain the current state. This prevents operational errors.

If there is a call from the wireless communications apparatus A160 during the standby state (S1606: Yes), the wireless communications apparatus B161 uses the verification ID to check that the call is from the wireless communications apparatus A160 (S1607); if it is confirmed that the call is from the wireless communications apparatus A160, the wireless communications apparatus B161 issues an operation processing start instruction command to the host computer B11 via the interface cable BR181 (S1608). The operation processing start instruction command is a command for the wireless communications apparatus B161 to instruct the host computer B11 to begin operation processing.

Upon receiving the operation processing start instruction command (S1602: Yes), the host computer B11 recognizes for the first time that a trouble that makes the operation processing impossible to continue at the site A100 has occurred at the site A100, and begins operation processing (S1603). When the host computer B11 begins the operation processing, this signifies that the operation processing that had been performed by the host computer A10 of the site A100 has been taken over by the host computer B11 of the site B101.

(II-8) The Operation of the Wireless Communications Apparatus A160 after a Site Failure of the Site A100:

Let us assume that a site failure occurs at the site A100, i.e., a failure caused by an earthquake, fire or terrorism, for example, occurs on the entire system within the site A100, as in FIG. 6. Furthermore, a total disconnection of networks between sites may occur in addition to the site failure, as shown in FIG. 8.

The operation of the wireless communications apparatus A160 after a site failure of the site A100 is described below with reference to FIG. 15.

Figure 15:
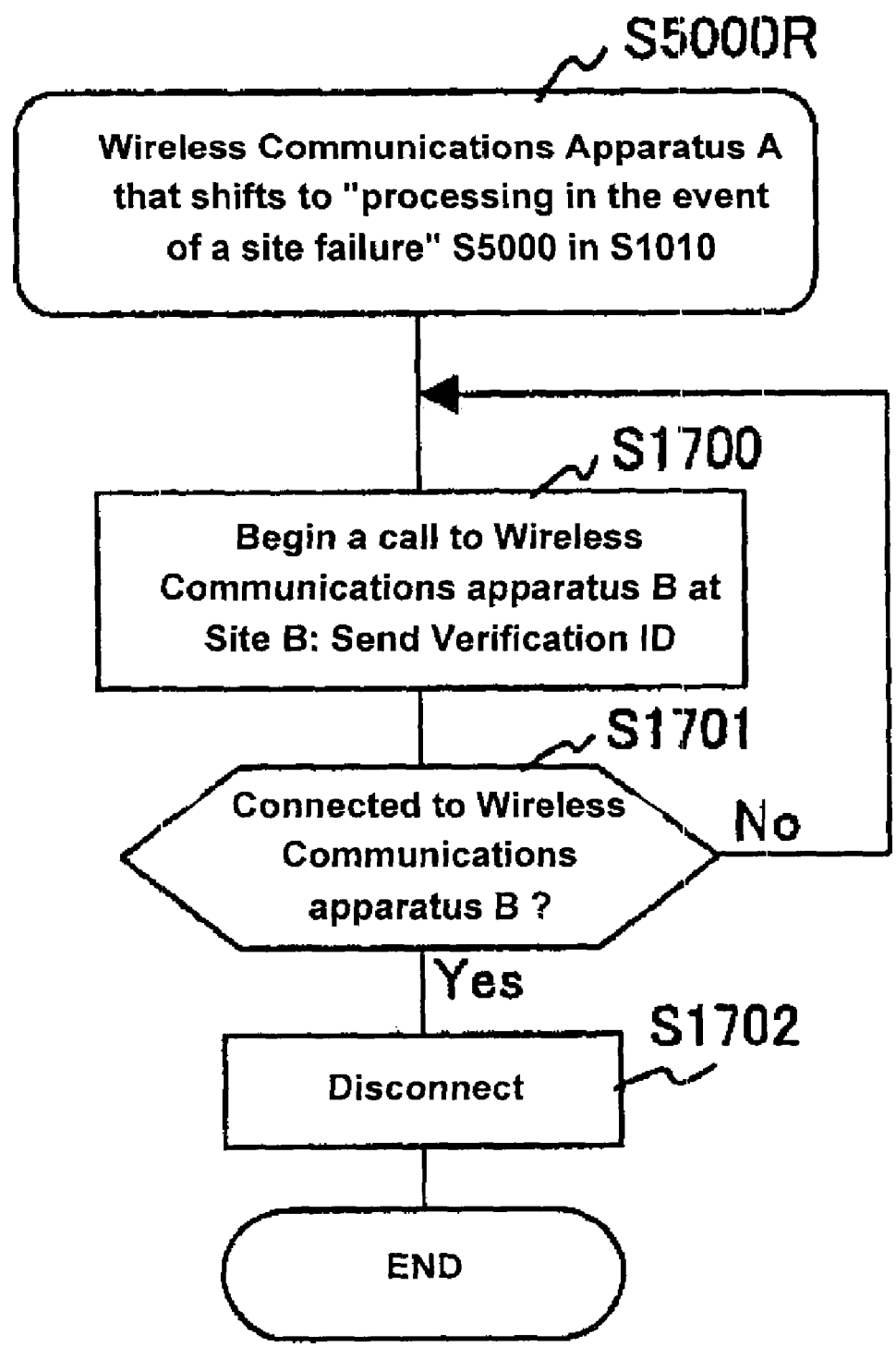
FIG. 15 shows a flowchart of the operation of the wireless communications apparatus A after a site failure of the site A.

FIG. 15 is a flowchart of the operation of the wireless communications apparatus A160 after a site failure of the site A100 occurred.

However, we will assume that the failure has not affected the wireless communications apparatus A160, since it is in a black box blocked from the rest of the system.

The operation of the wireless communications apparatus A160 is the operation that takes place when the wireless communications apparatus A160 in S1000 shifts to the "processing in the event of a site failure" (S5000R).

Due to the fact that the wireless communications apparatus A160 of the site A100 monitors the status of the host computer A10 via the interface cable AR180, the wireless communications apparatus A160 determines that a site failure has occurred at the site A100, begins a call to the wireless communications apparatus B161, and sends a packet containing its own verification ID to identify itself (S1700).

The wireless communications apparatus A160 repeats the call to the wireless communications apparatus B161 until it connects with the wireless communications apparatus B161 (S1701: No); if the call connects with the wireless communications apparatus B161 once (S1701: Yes), the call is immediately disconnected (S1702). When a call from the wireless communications apparatus A160 to the wireless communications apparatus B161 is accepted even once, it is deemed that taking over of the operation processing is completed.

The following processing by the host computer B11 and the wireless communications apparatus B161 of the site B101 is the same as the "processing in the event of a storage apparatus system failure" (S3000H, S3000R).

Since the host computer B11 of the site B101 becomes incapable of monitoring the status of the site A100 using the IP network 30 and/or the FC network 90 in the total disconnection of networks between sites and in the site failure (S801: Yes), the host computer B11 shifts to the "processing in the event of inability to obtain information from the site A" (S4000H).

The host computer B11 issues a standby instruction command to the wireless communications apparatus B161 (S1600), and the wireless communications apparatus B161 waits for a call from the wireless communications apparatus A160 (S1605, S1606). When the wireless communications apparatus B161 receives a call and verification ID from the wireless communications apparatus A160, the wireless communications apparatus B161 issues an operation processing start instruction command to the host computer B11 (S1608), and the host computer B11 begins operations (S1603).

Second Embodiment

A cluster computing system in accordance with a second embodiment of the present invention is described below with reference to FIG. 16.

Figure 16:
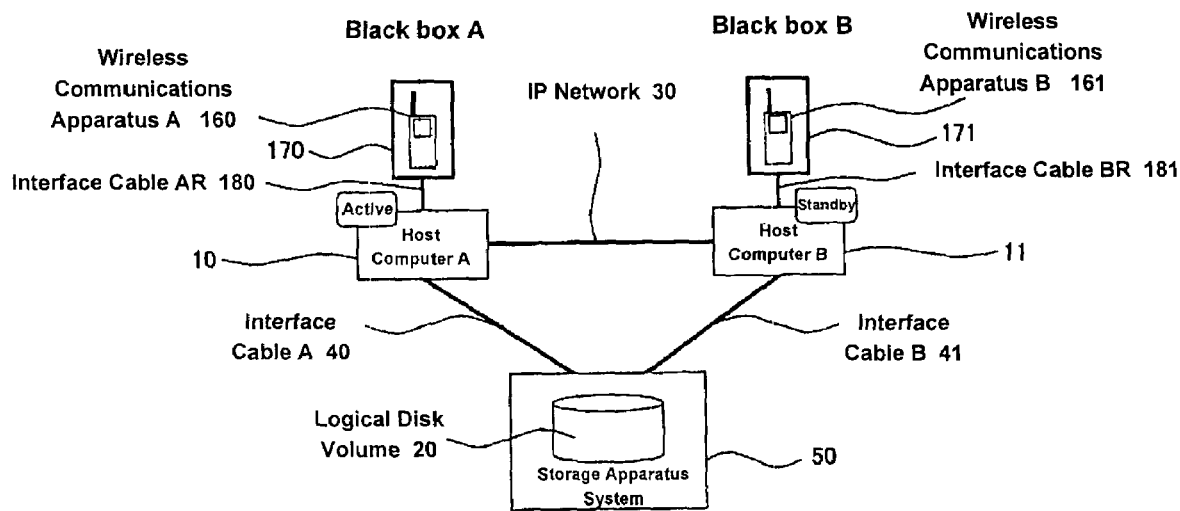
FIG. 16 shows a diagram of a system configuration of a cluster computing system in accordance with a second embodiment of the present invention.
Figure 17:
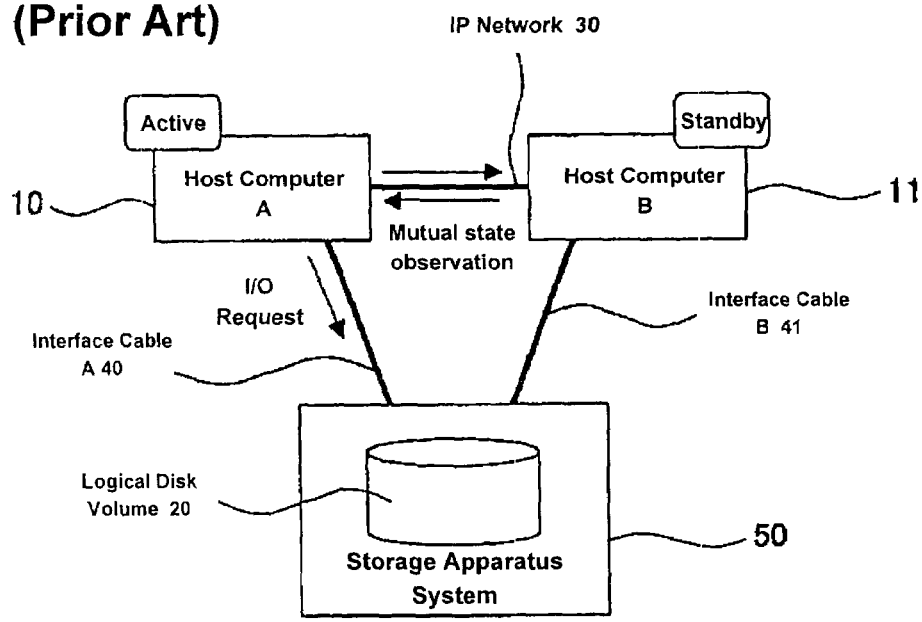
FIG. 17 shows a diagram of a system configuration of a general cluster computing system in which a storage apparatus system is shared by host computers.
Figure 18:
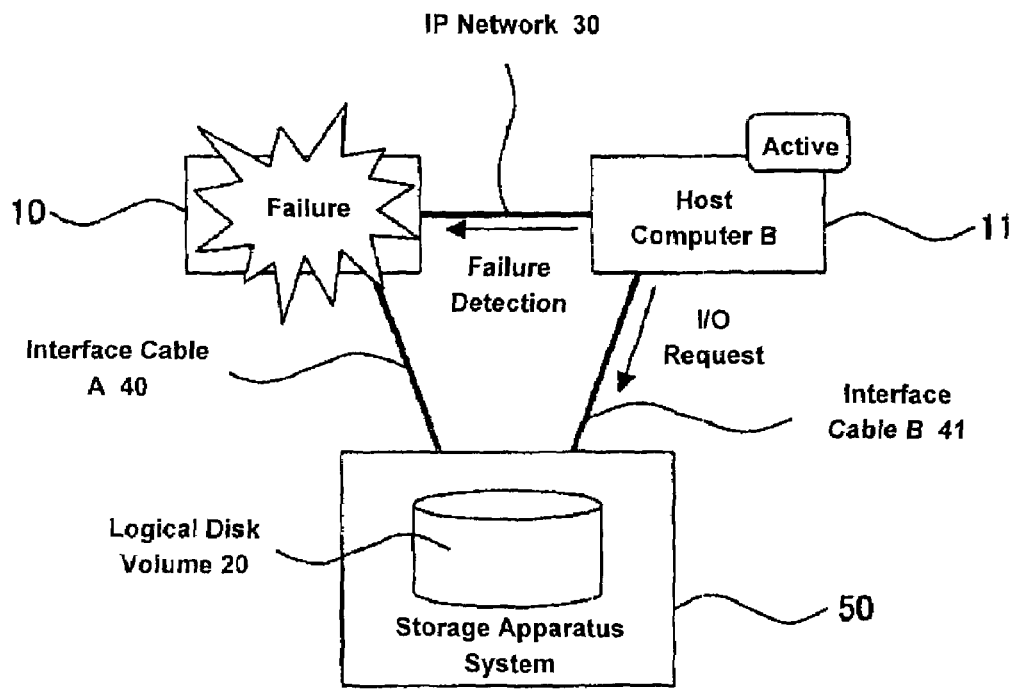
FIG. 18 shows a diagram illustrating a situation in which a failure occurs in a host computer A in the system shown in FIG. 17.
Figure 19:
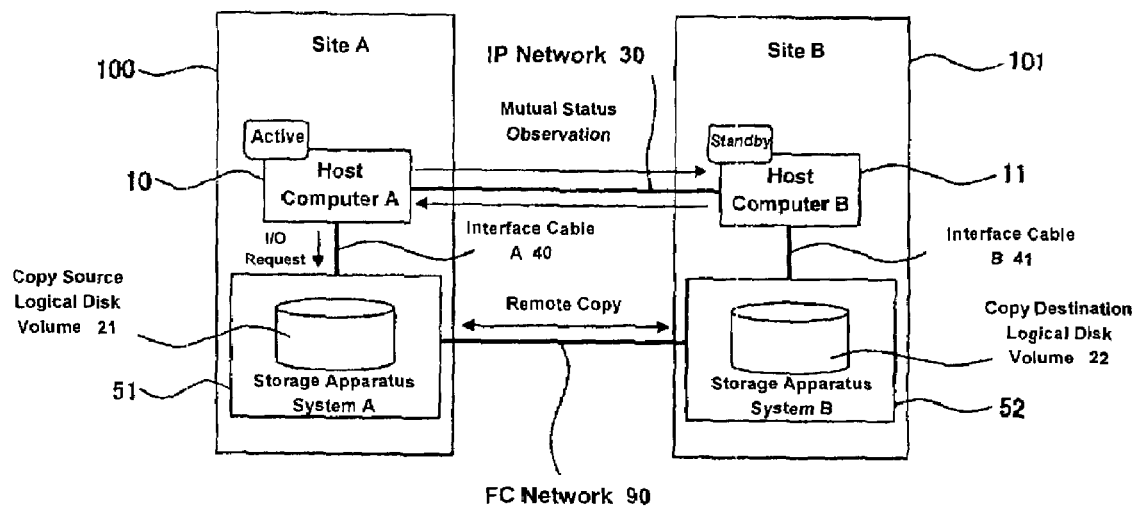
FIG. 19 shows a diagram of a system configuration of a general cluster computing system in which a separate storage apparatus system is provided for each site.
Figure 20:
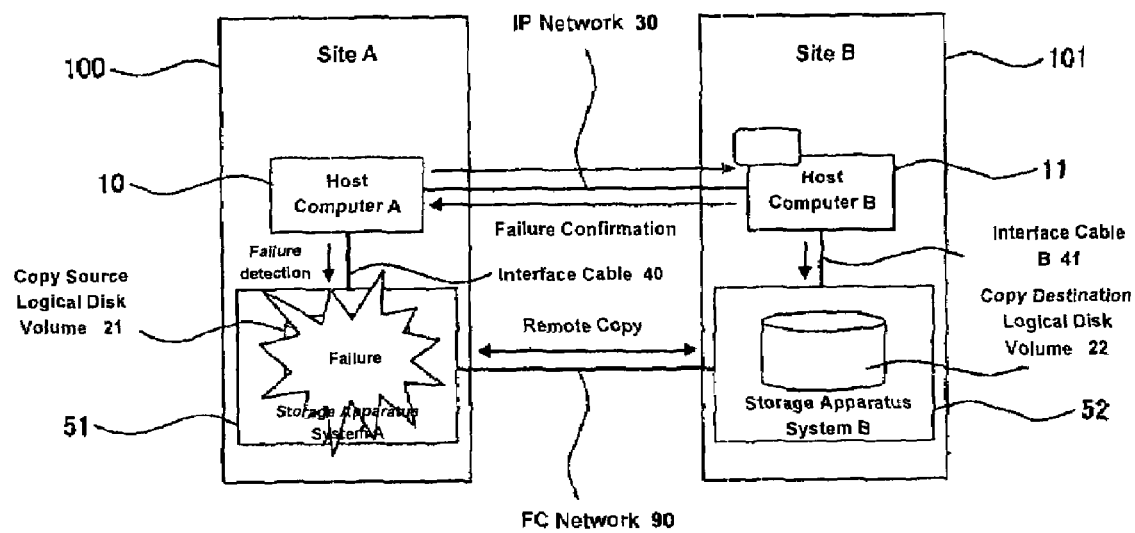
FIG. 20 shows a diagram illustrating a situation in which a failure occurs in a storage apparatus system A of a site A in the system shown in FIG. 19.
Figure 21:
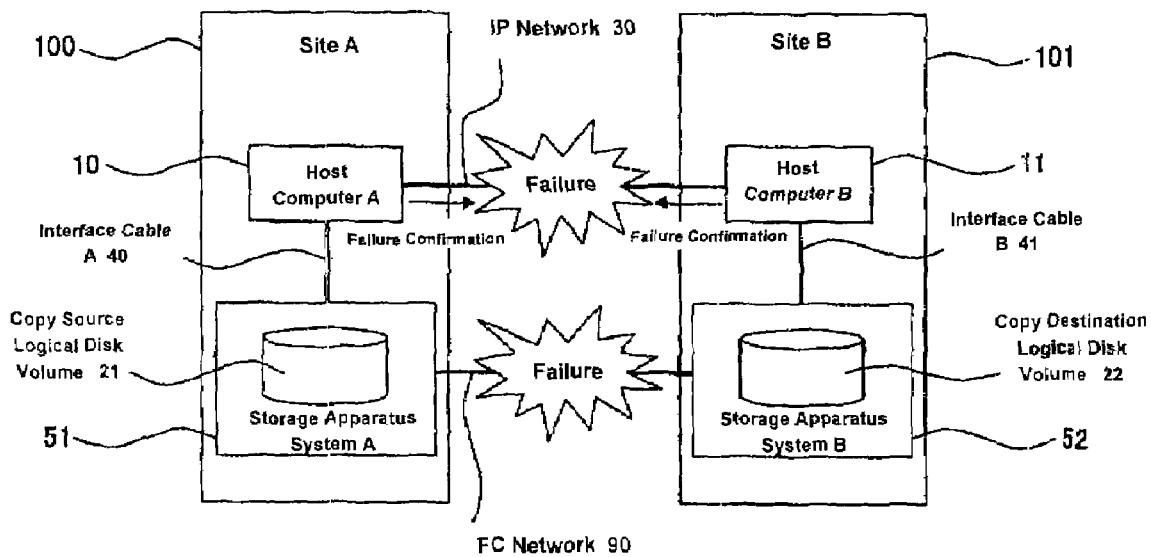
FIG. 21 shows a diagram illustrating a situation in which a failure occurs on an IP network 30 and an FC network 90 in the configuration shown in FIG. 19.
Figure 22:
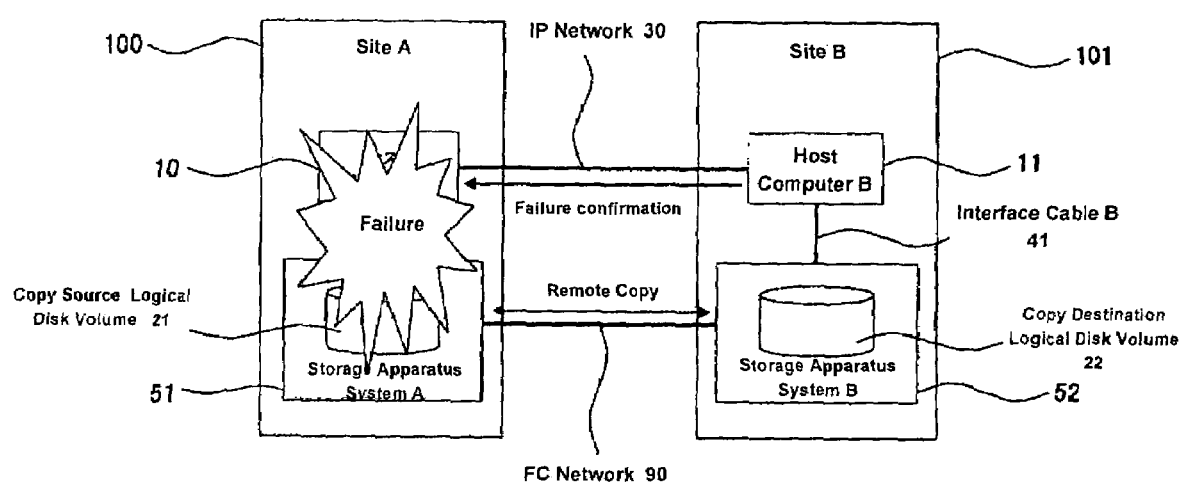
FIG. 22 shows a diagram illustrating a situation in which a failure occurs at the site A in the configuration shown in FIG. 19.

FIG. 16 is a diagram of a system configuration of the cluster computing system according to the second embodiment of the present invention.

In the first embodiment, the site A100 and the site B101 had separate storage apparatus systems to perform remote copying.

In the present embodiment, a site A100 including a wireless communications apparatus A160 and a site B101 including a wireless communications apparatus B161 share a storage apparatus system 50. When a failure occurs at the site A100 in this system configuration, by having the wireless communications apparatus A160 communicate with the wireless communications apparatus B161, communication takes place between an active system and a standby system and failure recovery processing can be performed, as in the first embodiment.

As described above, according to the present invention, by adding to a conventional cluster computing system having a remote copy function a function to report failures to a counterpart site using wireless communications apparatuses, a failure of a counterpart site can be recognized even after a total disconnection of networks between sites occurs. Consequently, even if a failure occurs at a site performing operation processing after the occurrence of a total disconnection of networks between sites, a proper judgment can be made as to whether the other site should take over the operation processing.

Instead of strengthening the disaster recovery function by simply providing redundant wire cables, which are used as a means to monitor status in conventional systems, the present invention strengthens the disaster recovery function by adding a means to report status using wireless communications based on an infrastructure different from wire cables.

In this way, according to the present invention, a cluster computing system can be provided that has an active system and a standby system, and that can operate both systems without inconsistencies even in the event of a failure of networks that connect the sites of the two systems, regardless of the mode of failure, and recover from the failure.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A cluster computing system comprising:
   an active system having an active host computer and an active storage system, connected to said active host computer, for storing data accessible by said active host computer;
   a standby system having a standby host computer and a standby storage system, connected to said standby host computer, for storing data accessible by said standby host computer;
   a wireline network which connects said active and standby systems to each other,
   wherein said wireline network includes a cluster network which connects the host computers of the active and standby systems to each other and an inter-storage network which connects the storage systems of the active and standby systems to each other;
   an active wireless communications module, directly coupled to the active system, for performing wireless communications; and
   a standby wireless communications module, directly coupled to the standby system, for performing wireless communications,
   wherein said cluster network is used by each of said active and standby systems to monitor the status of the other of said active and standby systems,
   wherein said each of said active and standby systems monitors, via said cluster network, the status of the other of said active and standby systems by transmitting status communications between said each of said active and standby systems and the other of said active and standby systems,
   wherein said inter-storage network is used to conduct a remote copy function between said active and standby systems,
   wherein said remote copy function operates, via said inter-storage network, such that when said active host computer writes data in said active storage system, a copy of said data is stored in said standby storage system,
   wherein the active wireless communications module, directly coupled to the active system, monitors whether a failure has occurred in said active system and executes a first failure report to wirelessly report a failure of the active system to the standby wireless communications module, directly coupled to the standby system,
   wherein the active wireless communications module, directly coupled to the active system, monitors whether a network disconnection state has occurred in the wireline network including said cluster network and said inter-storage network connecting the active system and the standby system and executes a second failure report to wirelessly report the network disconnection state has occurred in the wireline network to the standby wireless communications module, directly coupled to the standby system, and
   wherein the second failure report is executed when both of the cluster network and the inter-storage network have the network disconnection state at the same time, and
   wherein, upon receiving the first or second failure report from the active wireless communication module, directly coupled to the active system, the standby wireless communication module, directly coupled to the standby system, issues a predetermined operation processing instruction command to the standby host computer at the standby system based on whether the first failure report or the second failure report is received.

2. A cluster computing system according to claim 1, wherein the cluster network is an Internet Protocol (IP) network, and the inter-storage network is a Fibre Channel (FC) network.

3. A cluster computing system according to claim 1, wherein the active wireless communications module, directly coupled to the active system, wirelessly transmits a packet including a verification ID of the active system to the standby wireless communications module at the standby system, and upon receiving the packet including the verification ID, the standby wireless communications module, directly coupled to the standby system, recognizes the failure of the active system or the network disconnection state of the wireline network and performs operations based on the verification ID.

4. A cluster computing system according to claim 1, wherein, upon receiving a call instruction command from the active host computer at the active system, the active wireless communications module, directly coupled to the active system wirelessly communicates the first or second failure report to the standby wireless communications module, directly coupled to the standby system.

5. A cluster computing system according to claim 1, wherein each of the active wireless communication module, directly coupled to the active system and the standby wireless communication module, directly coupled to the standby system, is shielded from interference in its operation from a site failure of each of the active system and the standby system.

6. A cluster computing system comprising:
   an active system having an active host computer and an active storage system, connected to said active host computer, for storing data accessible by said active host computer;
   a standby system having a standby host computer and a standby storage system, connected to said standby host computer, for storing data accessible by said standby host computer;
   a wireline network which connects said active and standby systems to each other,
   wherein said wireline network includes a cluster network which connects the host computers of the active and standby systems to each other and an inter-storage network which connects the storage systems of the active and standby systems to each other;
   an active wireless communications module, directly coupled to the active system, for performing wireless communications;

a standby wireless communications module, directly coupled to the standby system, for performing wireless communications;

a first module that keeps a system operation of the active system to continue when the active system cannot obtain information from the standby system via the wireline network; and a second module that, upon detection of a failure of the active system, executes a first failure report to cause the active wireless communication module, directly coupled to the active system, to wirelessly report the failure of the active system to the standby wireless communications module, directly coupled to the standby system, wherein said second module further, upon detection that a network disconnection state has occurred in said wireline network including said cluster network and said inter-storage network connecting the active system and the standby system, executes a second failure report to cause the active wireless communication module, directly coupled to the active system, to wirelessly report that the network disconnection state has occurred in the wireline network to the standby wireless communications module, directly coupled to the standby system, wherein said cluster network is used by each of said active and standby systems to monitor the status of the other of said active and standby systems, wherein said each of said active and standby systems monitors, via said cluster network, the status of the other of said active and standby systems by transmitting status communications between said each of said active and standby systems and the other of said active and standby systems, wherein said inter-storage network is further used to conduct a remote copy function between said active and standby systems, wherein said remote copy function operates, via said inter-storage network, such that when said active host computer writes data in said active storage system, a copy of said data is stored in said standby storage system, wherein the active wireless communication module, directly coupled to the active system, wirelessly transmits the second failure report to the standby wireless communication module, directly coupled to the standby system, when said wireline network including both of the cluster network and the inter-storage network have the network disconnection state at the same time, wherein the active wireless communication module, directly coupled to the active system, includes said second module, and wherein, upon receiving the first failure report or the second failure report from the active wireless communication module, directly coupled to the active system, the standby wireless communication module, directly coupled to the standby system, issues a predetermined operation processing instruction command to the standby host computer at the standby system based on whether the first failure report or the second failure report is received.

7. A cluster computing system according to claim 6, further comprising:

a third module that, upon receiving the first failure report or the second failure report from the active wireless communication module, directly coupled to the active system, makes the standby wireless communication module, directly coupled to the standby system, start a predetermined operation processing based on whether the first failure report or the second failure report is received.

8. A cluster computing system according to claim 6, wherein the active wireless communications module, directly coupled to the active system, wirelessly transmits a packet including a verification ID of the active system to the standby wireless communications module, directly coupled to the standby system, and upon receiving the packet including the verification ID, the standby wireless communications module, directly coupled to the standby system, recognizes the failure of the active system or the network disconnection state of the wireline network and performs operations based on the verification ID.

9. A cluster computing system according to claim 6, wherein, upon receiving a call instruction command from the active host computer at the active operating system, the active wireless communications module, directly coupled to the active system, wirelessly communicates the first or second failure report to the standby wireless communications module, directly coupled to the standby system.

10. A cluster computing system according to claim 6, wherein the active wireless communication module, directly coupled to the active system, monitors a failure of the active host computer of the active system, and wirelessly communicates, upon detecting the failure, the first failure report to the standby wireless communications module, directly coupled to the standby system.

11. A cluster computing system according to claim 6, wherein each of the active wireless communication module, directly coupled to the active system, and the standby wireless communication module, directly coupled to the standby system, is shielded from influence of a site failure of each of the active system and the standby system.

12. A cluster computing system according to claim 7, wherein upon finding a failure on the active storage apparatus of the active system, the active host computer at the active system gives an instruction to the active wireless communication module, directly coupled to the active system, to wirelessly communicate the first failure report to the standby wireless communication module, directly coupled to the standby system.

13. A cluster computing system according to claim 12, wherein upon receiving the first failure report from the active wireless communication module, directly coupled to the active system, the standby wireless communication module, directly coupled to the standby system, instructs the standby host computer at the standby system to start said predetermined operation processing.

14. A failover method for a cluster computing system including an active system having an active host computer and an active storage system, connected to said active host computer, for storing data accessible by said active host computer, a standby system having a standby host computer and a standby storage system, connected to said standby host computer, for storing data accessible by said standby host computer, a wireline network which connects said active and standby systems to each other, an active wireless communications module, directly coupled to the active system and a standby wireless communications module, directly coupled to the standby system, each wireless communications module for performing wireless communications, the failover method comprising the steps of:

making the active system to continue a system operation even when the active system cannot obtain information from the standby system via the wireline network;

upon detection of a failure of the active storage system at the active system, making the active system to instruct the active wireless communication module, directly coupled to the active system, to wirelessly communicate a first failure report to report the failure to the standby wireless communications module directly coupled to the standby system;

upon receiving the first failure report from the active wireless communication module, directly coupled to the active system, making the standby wireless communication module, directly coupled to the standby system, to issue a first predetermined operation processing instruction command to the standby host computer at the standby system to start a first processing operation, wherein said wireline network includes a cluster network which connects the host computers of the active and standby systems to each other and an inter-storage network which connects the storage systems of the active and standby systems to each other, upon detection that a network disconnection state has occurred in said wireline network, making the active system to instruct the active wireless communication module, directly coupled to the active system, to wirelessly communicate a second failure report to report that the network disconnection state has occurred in said wireline network to the standby wireless communications module, directly coupled to the standby system; and upon receiving the second failure report from the active wireless communication module, directly coupled to the active system, making the standby wireless communication module, directly coupled to the standby system, to issue a second predetermined operation processing instruction command to the standby host computer at the standby system to start a second processing operation, wherein said first predetermined operation processing instruction command and said second predetermined operation processing instruction command are different from each other, wherein said cluster network is used by each of said active and standby systems to monitor the status of the other of said active and standby systems, wherein said each of said active and standby systems monitors, via said cluster network, the status of the other of said active and standby systems by transmitting status communications between said each of said active and standby systems and the other of said active and standby systems, wherein said inter-storage network is used to conduct a remote copy function between said active and standby systems, wherein said remote copy function operates, via said inter-storage network, such that when said active host computer writes data in said active storage system, a copy of said data is stored in said standby storage system, and wherein the active wireless communication module, directly coupled to the active system, wirelessly transmits the second failure report to the standby wireless communication module, directly coupled to the standby system, when both of the cluster network and the inter-storage network have the network disconnection state at the same time.

15. A failover method for a cluster computing system including an active system having an active host computer and an active storage system, connected to said active host computer, for storing data accessible by said active host computer, a standby system having a standby host computer and a standby storage system, connected to said standby host computer, for storing data accessible by said standby host computer, a wireline network which connects said active and standby systems to each other, an active wireless communications module, directly coupled to the active system and a standby wireless communications module directly coupled to the standby system, each wireless communication module for performing wireless communications, the failover method comprising the steps of:

making the active wireless communication module, directly coupled to the active system, to detect a system condition of the active system;

when the active wireless communication module, directly coupled to the active system, detects a failure on the active system, making the active wireless communication module, directly coupled to the active system, to wirelessly communicate a first failure report to the standby wireless communication module at the standby system, wherein said wireline network includes a cluster network which connects the host computers of the active and standby systems to each other and an inter-storage network which connects the storage systems of the active and standby systems to each other, making the active wireless communication module, directly coupled to the active system, to detect whether a network disconnection state has occurred in said wireline network; and when the active wireless communication module, directly coupled to the active system, detects that the network disconnection state has occurred in said wireline network, making the active wireless communication module, directly coupled to the active system, to wirelessly communicate a second failure report to the standby wireless communication module at the standby system, wherein said cluster network is used by each of said active and standby systems to monitor the status of the other of said active and standby systems, wherein said each of said active and standby systems monitors, via said cluster network, the status of the other of said active and standby systems by transmitting status communications between said each of said active and standby systems and the other of said active and standby systems, wherein said inter-storage network is further used to conduct a remote copy function between said active and standby systems, wherein said remote copy function operates, via said inter-storage network, such that when said active host computer writes data in said active storage system, a copy of said data is stored in said standby storage system, wherein, upon receiving the first failure report from the active wireless communication module, directly coupled to the active system, the standby wireless communication module, directly coupled to the standby system, issues a first operation processing instruction command to the standby host computer at the standby system to start a first processing operation, wherein, upon receiving the second failure report from the active wireless communication module, directly coupled to the active system, the standby wireless communication module, directly coupled to the standby system, issues a second operation processing instruction command to the standby host computer at the standby system to start a second processing operation, wherein said first operation processing instruction command and said second operation processing instruction command are different from each other, and wherein the active wireless communication module, directly coupled to the active system, wirelessly transmits the second failure report to the standby wireless communication module, directly coupled to the standby system, when both of the cluster network and the inter-storage network have the network disconnection state at the same time.

* * * * *